US011314550B2

(12) United States Patent
Mehta et al.

(10) Patent No.: US 11,314,550 B2
(45) Date of Patent: Apr. 26, 2022

(54) USER SPECIFIC EVENT THREADING

(71) Applicant: salesforce.com, inc., San Francisco, CA (US)

(72) Inventors: Percy Dara Mehta, Foster City, CA (US); Shan-Cheng Ho, Sunnyvale, CA (US); Clinton Tran, South San Francisco, CA (US); Kshama Lalit Thacker, San Mateo, CA (US); Jayanth Parayil Kumarji, Burlingame, CA (US)

(73) Assignee: salesforce.com, inc., San Francisco, CA (US)

( * ) Notice: Subject to any disclaimer, the term of this patent is extended or adjusted under 35 U.S.C. 154(b) by 66 days.

(21) Appl. No.: 16/801,965

(22) Filed: Feb. 26, 2020

(65) Prior Publication Data

US 2021/0149720 A1 May 20, 2021

Related U.S. Application Data

(60) Provisional application No. 62/937,206, filed on Nov. 18, 2019.

(51) Int. Cl.
*G06F 3/00* (2006.01)
*G06F 9/48* (2006.01)
*G06F 9/54* (2006.01)

(52) U.S. Cl.
CPC ............ *G06F 9/4881* (2013.01); *G06F 9/542* (2013.01)

(58) Field of Classification Search
CPC .............................. G06F 9/542; G06F 9/4881
See application file for complete search history.

(56) References Cited

U.S. PATENT DOCUMENTS

| 6,987,847 B1* | 1/2006 | Murphy | H04L 51/04 379/201.1 |
| 7,259,666 B1* | 8/2007 | Hermsmeyer | G06F 11/0709 340/517 |
| 2007/0118602 A1* | 5/2007 | Heinla | H04L 51/22 709/206 |
| 2010/0306555 A1* | 12/2010 | Sasahara | H04L 9/083 713/193 |
| 2019/0026491 A1* | 1/2019 | Telford | G06F 21/6227 |

OTHER PUBLICATIONS

Al ya Akhmetova, Discovery of Frequent Episodes in Event Sequences. (Year: 2006).*
Zhemin Yang, AppIntent: Analyzing Sensitive Data Transmission in Android for Privacy Leakage Detection. (Year: 2013).*

* cited by examiner

*Primary Examiner* — Lechi Truong
(74) *Attorney, Agent, or Firm* — Holland & Hart LLP

(57) ABSTRACT

The techniques may include maintaining a thread of events for a plurality of users, where each element of the thread corresponds to an event/activity and includes at least a next field that includes a first subset of the plurality of users and a previous field that includes a second subset of the plurality of users. These techniques may allow new events to be quickly added and prior elements may be updated to reflect the addition. Further, the thread elements may allow the thread to be quickly traversed to identify queried information such that the information may be displayed to a user.

17 Claims, 13 Drawing Sheets

| Sequence of events in increasing order of time | | | | | | Status of HasNext (HN), HasPrior (HP) over time (changes shown in bold text) | | | | |
|---|---|---|---|---|---|---|---|---|---|---|
| Time | Contributor | ThreadId | EventKey | Involved Contact | Insight Present | T0 | T1 | T2 | T3 | T4 |
| T0 | U1 | TH1 | EK0 | C0,C1,C2,C3 | True | HN: [ ]<br>HP: [ ]<br>HI: [C0,C1,C2,C3] | HN: [C0,C1,C2]<br>HP: [ ]<br>HI: [C0,C1,C2,C3] | HN: [C0,C1,C2,C3]<br>HP: [ ]<br>HI: [C0,C1,C2,C3] | HN: [C0,C1,C2,C3]<br>HP: [ ]<br>HI: [C0,C1,C2,C3] | HN: [C0,C1,C2,C3]<br>HP: [ ]<br>HI: [C0,C1,C2,C3] |
| T1 | U1 | TH1 | EK1 | C0,C1,C2 | False | | HN: [ ]<br>HP: [C0,C1,C2]<br>HI: [C0,C1,C2] | HN: [C0,C1,C2]<br>HP: [C0,C1,C2]<br>HI: [C0,C1,C2] | HN: [C0,C1,C2]<br>HP: [C0,C1,C2]<br>HI: [C0,C1,C2] | HN: [C0,C1,C2]<br>HP: [C0,C1,C2]<br>HI: [C0,C1,C2] |
| T2 | U1 | TH1 | EK2 | C0,C1,C2,C3,C4 | False | | | HN: [ ]<br>HP: [C0,C1,C2,C3]<br>HI: [C0,C1,C2,C3] | HN: [C2]<br>HP: [C0,C1,C2,C3]<br>HI: [C0,C1,C2,C3] | HN: [C0,C1,C2,C4]<br>HP: [C0,C1,C2,C3]<br>HI: [C0,C1,C2,C3] |
| T3 | U1 | TH1 | EK3 | C2 | True | | | | HN: [ ]<br>HP: [C2]<br>HI: [C2] | HN: [ ]<br>HP: [C2]<br>HI: [C2] |
| T4 | U1 | TH1 | EK4 | C0,C1,C4 | False | | | | | HN: [ ]<br>HP: [C0,C1,C4]<br>HI: [C0,C1] |

| ThreadingTracker Table | | | | | | |
|---|---|---|---|---|---|---|
| | | Event Key | | | | |
| OrgId | ThreadId | Time | Type | Hash | Set<Participant> | HasInsight |
| O1 | TH1 | T0 | EMAIL | H0 | C0,C1,C2,C3 | True |
| O1 | TH1 | T1 | EMAIL | H1 | C0,C1,C2 | False |
| O1 | TH1 | T2 | EMAIL | H2 | C0,C1,C2,C3,C4 | False |
| O1 | TH1 | T3 | EMAIL | H3 | C2 | True |
| O1 | TH1 | T4 | EMAIL | H4 | C0,C1,C4 | False |

USER SPECIFIC EVENT THREADING

CROSS REFERENCE

The present application for patent claims priority to U.S. Provisional Patent Application No. 62/937,206 by Mehta et al., entitled "USER SPECIFIC EVENT THREADING," filed Nov. 18, 2019, which is assigned to the assignee hereof and is expressly incorporated by reference in its entirety herein.

FIELD OF TECHNOLOGY

The present disclosure relates generally to database systems and data processing, and more specifically to user specific event threading.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support an email messaging system that ingests emails from multiple different user mailboxes. These emails may be viewed across several windows of time. Such a view may lack organization and may be difficult to analyze.

BRIEF DESCRIPTION OF THE DRAWINGS

FIG. 3 illustrates an example of a message timeline that supports user specific event threading in accordance with aspects of the present disclosure.

DETAILED DESCRIPTION

Implementations described herein provide for efficient tracking of threads of events, where events may correspond to exchanged emails, messages, meetings, phone calls, etc. The described techniques may allow for context specific threads to be efficiently retrieved and displayed, where the context may depend on a specific user to the thread. A threaded view of an activity timeline may include a reverse chronological timeline of events, with a requirement that all events (e.g., emails across contributors) belonging to the same thread/conversation be collapsed into a single leading edge representing the most recent interaction involving the specified participant(s).

Various filters may be applied to threaded views using the techniques described herein such that context specific views may be displayed to a user. The techniques may include maintaining a thread of events for a plurality of users, where each element of the thread corresponds to an event/activity and includes at least a next field that includes a first subset of the plurality of users and a previous field that includes a second subset of the plurality of users. These techniques may allow new events to be quickly added and prior elements may be updated to reflect the addition. Further, the thread elements may allow the thread to be quickly traversed to identify queried information such that the queried information may be displayed to a user.

Aspects of the disclosure are initially described in the context of an environment supporting an on-demand database service. Aspects of the disclosure are further described with respect to a computing system, a message timeline, message chains, a thread tracking table, and a user interface. Aspects of the disclosure are further illustrated by and described with reference to apparatus diagrams, system diagrams, and flowcharts that relate to user specific event threading.

Figure 1:
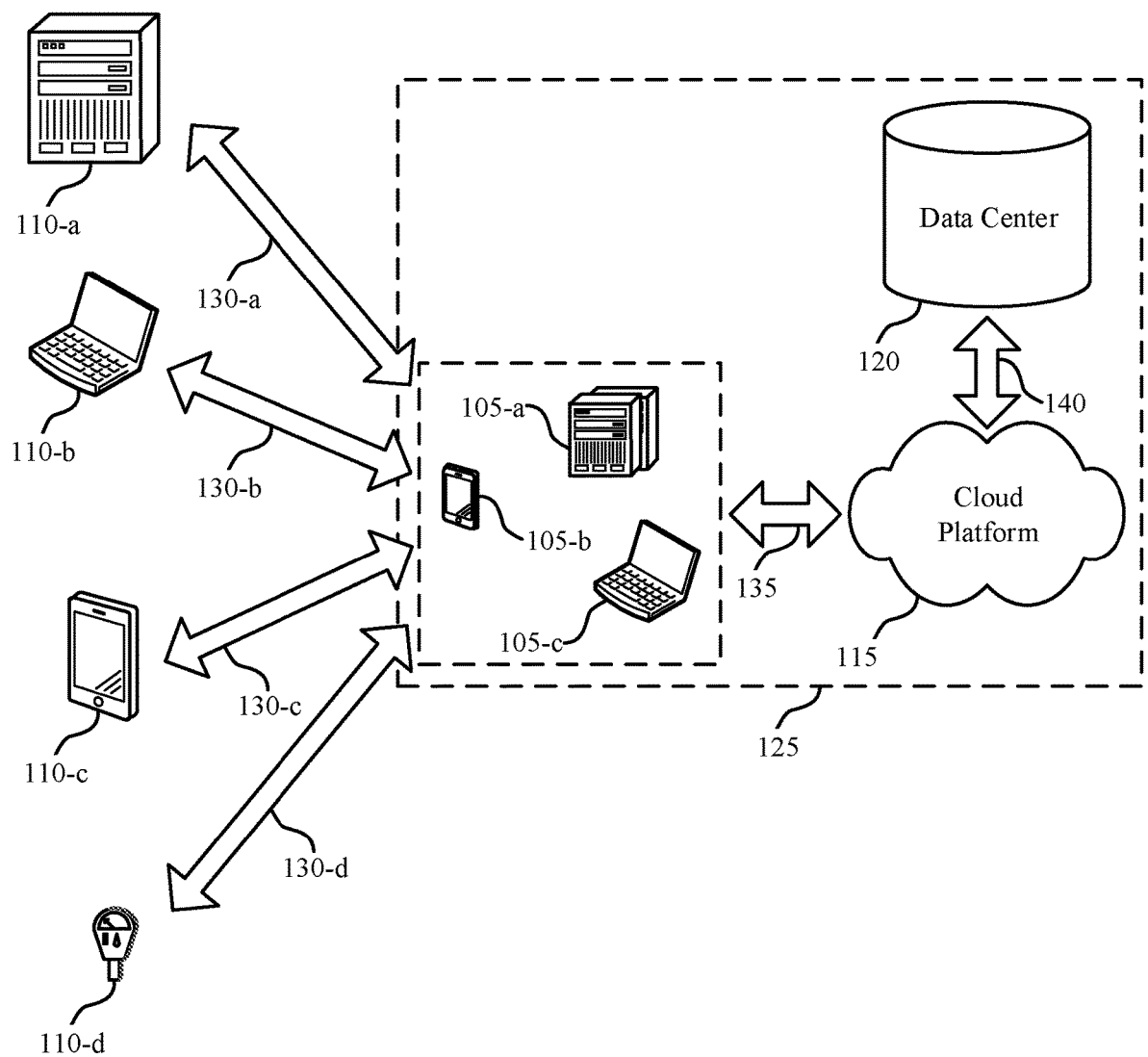
FIG. 1 illustrates an example of a system for data processing that supports user specific event threading in accordance with aspects of the present disclosure.

FIG. 1 illustrates an example of a system 100 for cloud computing that supports user specific event threading in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, the cloud platform 115 includes a communication manager with an event threading component that organizes events (e.g., emails) based on participants. The event threading component may support efficient querying and display of threaded events in accordance with one or more selected (e.g., queried) participants. The component may monitor communications or events between various users (e.g., users within a cloud client 105) and external users (e.g., contacts 110) and update the threaded events based on the communications or events. For example, the component may maintain a thread corresponding to events including an external user (e.g., a contact 110). Each time an event occurs (e.g., an email is sent), an element is added to the event thread, and the element includes various fields for maintaining or retrieving a threaded view based on one of the participants. As such, as participants are included in or excluded from various events corresponding to the thread, the system automatically maintains the thread state for each participant separately, such that a participant based thread may not include events for which the participant was not a contributor (e.g., was not included in the message).

Some systems may provide threaded views of communications, but these views may correspond to a message to which the viewer was a participant. That is, the view does not maintain any context for all participants of various events within the thread. Accordingly, the thread view may be static for each viewer and may not be able to dynamically maintain context. Further, querying on these threaded views may not identify threads for which a queried user is in a prior message (e.g., not a participant in the latest message) such that the query may return inaccurate results. Further, as users are added and removed from threads (based on being included or not included in subsequent emails, for example), maintaining all the messages may incur significant computing overhead as duplicate emails (e.g., for all users) may be stored to maintain a thread state.

To solve these problems, the event threading component of the cloud platform 115 may maintain threads of messages according to all participants in the thread and such that each thread may be queried based on one or more of the participants. The results of a query may include those events for which the queried participants were a contributor. To support these techniques, the component may maintain a doubly linked list where each element of the linked list corresponds to an event (e.g., an exchanged email, a meeting, a phone call, etc.) of the thread. Each element includes various fields that may be used to maintain the context for various participants. For example, each element may include a "has next" or next field that lists users that are participants to later/subsequent activities in the thread. Each element may also include a "has previous" or previous field that lists users that are participants to prior (chronologically) activities within a thread. Each time a new activity is added to a thread, these fields may be updated using an efficient backfilling technique. Further, these fields support for efficient participant contextual thread retrieval. That is, if the system receives a query for a thread based on a particular user of the thread, the system may efficiently retrieve a "leading edge" event (e.g., the most recent event in a series of events belonging to a single thread/conversation) using the included fields (e.g., previous and/or next fields) for the elements. These techniques may also support Boolean querying such that threads based on multiple participants may be quickly retrieved.

The elements may also include an insight field that lists users that were a contributor to events (e.g., an event corresponding to the current element or an event corresponding to prior elements) in the thread that have "insights." An insight may be something detected within a message that may provide further context to the thread. For example, an insight may be a mention of times for meeting, an identification of an important contributor (e.g., an executive in an organization) to a message, etc. Thus, insights may be identified using various semantic analysis and machine learning techniques.

An activity/event may correspond to any event that has a timestamp and one or more participants such that several events can be organized in a chronological fashion with or without additional filters. Events may include email, meeting, voice call, chat etc. A contributor may be a user in an organization who has connected his/her activity data sources with the systems as described herein. For example, a contributor may authorize the described system to connect to their Gmail or Exchange email and calendar services. A participant/involved contact (e.g., contact 110) may be an external person who is involved in the activity. This person could be a CRM contact, lead or person type. An insight may be an additional piece of derived information that can provide quick enrichment/inference of the activity data with appropriate quick actions. Examples of insights include an executive being involved in the event, an intent to schedule a meeting, discuss pricing, angry customer, etc. Insights may be generally derived by executing machine learning models, semantic analysis, or other natural language processing (NLP) on activities. An activity timeline/thread may correspond to a stream of activities in a range of time, in the context of one or more participants where activities are sourced from the entire organization (aka multiple contributors). Additional filters can be applied to this stream for better context. For example, the system may surface activities that have one or more insights or an insight of a specific type.

It should be appreciated by a person skilled in the art that one or more aspects of the disclosure may be implemented in a system 100 to additionally or alternatively solve other problems than those described above. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In one example utilization of the system supported by the cloud platform 115, a user of the threading component may be a sales manager for an organization. The sales manager may want to view various threads corresponding to a particular sales lead/customer. The sales manager may indicate a thread corresponding to the sales lead and one or more participants to the thread (e.g., sales associated that communicated with the sales lead). The system may query the thread based on the one or more participants and display the thread based on the queried participant. Thus, the sales manager may be able to view all events for which the participant was a contributor. The system may allow the sales manager to quickly switch between various participants to the thread. The sales manager may also view the thread in the context of the sales lead, such as to view all events for which the sales lead participated.

Figure 2:
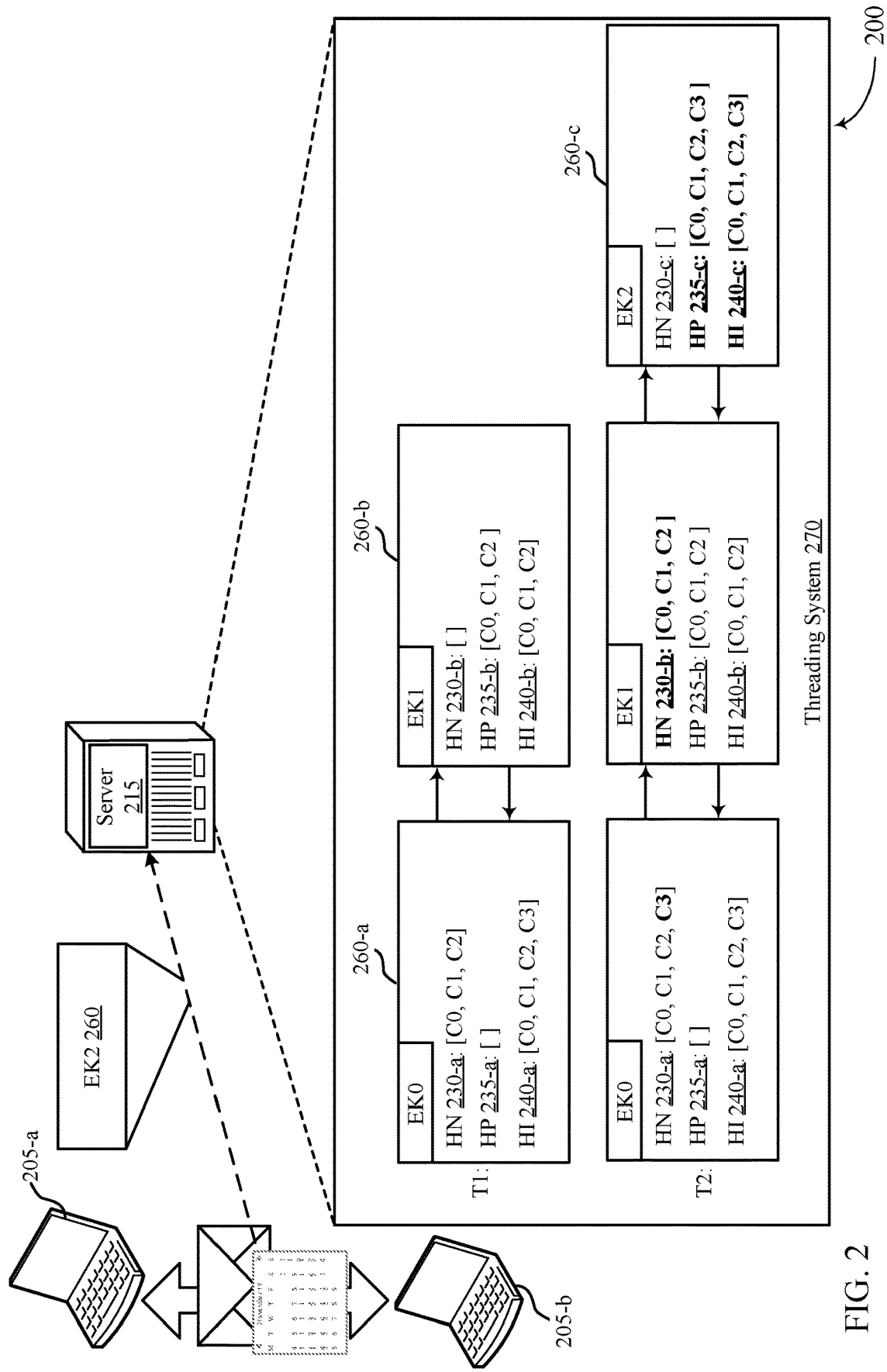
FIG. 2 illustrates an example of a system that supports user specific event threading in accordance with aspects of the present disclosure.

FIG. 2 illustrates an example of a system 200 that supports user specific event threading in accordance with aspects of the present disclosure. The system 200 includes user device 205 and a server 215. The user devices may be examples of devices of cloud clients 105 and/or contacts 110 and may correspond to participants or users to a thread of activities. The server 215 may be an example of a communication server (e.g., an email server) or may have access to communications or events managed by a separate server (e.g., an email server). The server monitors various interactions (e.g., interactions 130 of FIG. 1) (events) between various users. The server 215 includes a threading system 270 according to aspects described herein. The interactions/events may be examples of exchanged emails, meetings, phone calls, text/SMS messages, etc. The threads may be implemented or maintained as doubly linked lists.

The threading system 270 may maintain various threads that correspond to sequences of activities/events for various participants to the thread. The thread may maintain a thread identifier (thread ID), which may be based on a header of one or more of the messages. The threading system 270 maintains a thread that corresponds to a plurality of participants (e.g., C0, C1, C2, C3, etc.), which may correspond to user devices 205. At time T1, the thread includes events 0 and 1, with corresponding event keys (EK) as fields in elements 260 of the threads corresponding to the events. The event keys may be used to identify activities across contributors and may also be used to deduplicate events of a thread. The elements 260 may include various fields such as a next field (or has next field (HN)) 230, a previous field (or has previous field (HP)) 235, and an insight field (or has insight field (HI)) 240.

The HN field 230 indicates whether a participant to the event corresponding to the current element is a participant in a next event (e.g., any of the subsequent elements) in the thread. The HP field 235 indicates whether a participant to the event corresponding to the current element is a participant in a previous event (e.g., any of the previous elements) in the thread. Thus, as EK0 corresponds to the first element 260-a in the thread. The HP field 235-a is empty. After the event corresponding to EK1 occurs, the system backfills HN field 230-a in EK0 with [C0, C1, C2] because those users participate in EK1. At time T2, the server 215 receives an indication of event EK2 260 via an endpoint such as an API that the user authorized the server 215 to access. The server identifies the thread based on a header in the event indication and adds element 260-c corresponding to the event. The threading system 270 backfills HN field 230-b of EK1 (indicated in bold) to include C0, C1, and C2, because those users participated in (contributed to) event EK2. Further, the HP field 235-c of element 260-c is populated with users that contributed to the event EK2 and also contributed to previous events (e.g., EK1 or EK2) in the thread. Note that C3 is included because C3 participated in EK0 (but not EK1). Further, C3 is added to HN field 230-a of EK0 to indicate that C3 contributes to one of the subsequent events (e.g., EK2).

The HI field 240 indicates either that the current event has an identified insight or that one of the prior events has an identified insight. The listing of users in the insight field include those users that were participants to the message in the thread that has an insight. In the displayed thread of FIG. 2, EK0 has an identified insight with users C0, C1, C2, C3 contributing to that event. Thus, the HI field 240-a in element 260-a lists those users. Event EK1 includes C0, C1, C2 as contributors, so HI field 240-b lists those contributors (without C3 because C3 was not a contributor to EK1). However, C3 is a contributor to EK2 (and EK2 does not include an insight) but C3 is listed because C3 was a contributor to EK0 with an insight.

Using these techniques, the threading system 270 may maintain a context specific thread for each participant to the thread. Thus, when a thread is queried based one or more participants, the context specific thread may be retrieved that includes those events in which the queried users were contributors. In some cases, the query returns a first element (e.g., leading edge event) for the queried event. This may be achieved by identifying, starting with a latest element (e.g., EK2) in the thread of events arranged in a chronological order, a first element that does not include the target user in the first subset of the plurality of users in the HN field 230-*b*. Additionally, these techniques may allow various data (e.g., activities) to be easily removed.

Further, insights specific to participants may be maintained. The thread elements may also include an additional field referred to an contributor field or owner field (e.g., PriorEmailContributors or PriorEventContributors) that lists all current and prior participants to a thread (even if not a participant to latest message). This may allow participant as a viewer to retrieve threads involving the viewer.

Accordingly, given the possibility of varying participants across events comprising a thread, to support to query in the context of one or more participants and not show duplicates when paging, the described system 200 may:

1) Maintain participant (context) specific event chains for every thread/conversation to:
   a) Track the leading (most recent) edge of the thread involving that participant.
   b) Track if the leading (most recent) edge of the thread involving that participant has an ancestor (e.g., a prior event).
   c) Track if the leading (most recent) edge of the thread involving that participant or any of its ancestors has insight metadata.
2) Maintain a set of current and prior contributors for every event in the thread to support the viewing user filter (referred to as PriorEmailContributors or PriorEventContributors).
3) Compute a unique identifier aka ThreadId for every event such that events belonging to a single thread/conversation correspond to the ThreadID.

The system 200 may achieve solution 1 by materializing the thread into per participant chains of events tracked as doubly linked list along with insight information. The system 200 may maintain three additional pieces of information on every indexed event:

1) A HasNext pointer (e.g., HN field 230) that tracks participants that have a newer events in the chain. This value can change as new event emerge as well as if items in the chain get deleted when enforcing privacy rules (e.g., General Data Protection Regulation (GDPR)).
2) A HasPrior pointer (e.g., HP field 235) that tracks participants that have an older (ancestor) event in the chain. This value may change as new events emerge but can change when items in the chain get deleted when enforcing privacy rules (e.g., GDPR).
3) A HasInsight pointer (e.g., HI field 240) that tracks participants that have at least one insight on any ancestor including itself.

When fetching a threaded activity timeline for one or more participants in a given time range the system 200 may perform the following:

1) Fetch all events in the specified time range that involve at least one participant and none of the participants exist in the HasNext collection. For each thread, the system 200 may find one event that is referred to as the leading edge.
2) For each leading edge use its HasPrior pointer to indicate whether it is a thread (e.g., has ancestors for the participants in question).
3) For each leading edge, the system 200 may use the HasInsight pointer to indicate whether the leading edge or any of its ancestors has one or more insights for the participants in question. In the case of multiple participants, the system 200 may return true if at least one participant is in the list.

To facilitate computation of these values the system 200 may also create and maintain a new store called ThreadingTracker (e.g., threading tracking table 500 of FIG. 5) that tracks all events belonging to a thread (e.g., same ThreadId) along with its participants and whether each event has any additional insight metadata ordered by time.

FIG. 3 illustrates an example of a message timeline 300 that supports user specific event threading in accordance with aspects of the present disclosure. The message timeline 300 illustrates various events and how the events affect a thread of events including elements having the fields as described with respect to FIG. 2. The timeline 300 illustrates an email chain initiated by user U1 in organization O1 with threadId TH1 at time T0. The first email involves participants C0, C1, C2, C3. Over times T1 through T4 a series of replies with different participants ensues as shown in FIG. 3. FIG. 3 also shows how the HasNext, HasPrior and HasInsight collections transition over time. The timeline 300 includes the following events:

1) At time T0: Timeline 300 includes one email (e.g., event). Fetching the timeline for C0, C1, C2, or C3 may result in one email EK0 not shown as a thread (as there are no ancestors) with at least one insight.
2) At time T1: Email EK0 is part of a threaded conversation for participants C0, C1, C2 but not for C3. Fetching the timeline for C0, C1, C2 may return email EK1 shown as the leading edge of a thread with at least one insight. Fetching the timeline for C3 may result in one email not shown as a thread (as there are no ancestors) with at least one insight. Fetching the timeline for both C2 and C3 may return email EK1 as the leading edge of the thread with at least one insight. In this case, the participant check on the involved contact collection may be an OR condition. Further, to check for the existence of either while the participant check on hasNext is an AND condition to ensure both may not exist.
3) At time T2: C3 and C4 are added to email EK2 along with C0, C1, C2. As a result, email EK0 is part of a threaded conversation for participants C0, C1, C2 and C3 while email EK1 is now part of a threaded conversation for C0, C1, C2. Fetching the timeline for C0, C1, C2, or C3 may return email EK2 shown as the leading edge of a thread with at least one insight. Fetching the timeline for C4 may result in just one email EK2 not shown as a thread (as there are no ancestors for C4) with no insights.
4) At time T3: A private response is sent involving C2. As a result, email EK2 may be part of a threaded conversation for participant C2. Fetching the timeline for C2 may return email EK3 shown as the leading edge of a thread with at least one insight. Fetching the timeline for C0, C1, or C3 may still return email EK2 shown as the leading edge of a thread with at least one insight. Fetching the timeline for C4 may still result in one email EK2 not shown as a thread (as there are no ancestors for C4) with no insights.
5) At time T4: C0, C1, C4 are added back into a reply email EK4 that does not result in any insight. As a result, email EK2 is now part of a threaded conversation for participant C4. Fetching the timeline for either C0 or C1 may return email EK4 shown as the leading edge of a thread with at least one insight. Fetching the timeline for either C0, C1, or C3 may still return email EK2 shown as the leading edge of a thread with at least one insight. Fetching the timeline for C4 may return email EK4 shown as the leading edge of a thread with no insights. To visualize these changes from the perspective of each participant from time T0 to time T4 the system may also represent the changes as shown in FIG. 4.

Figure 4:
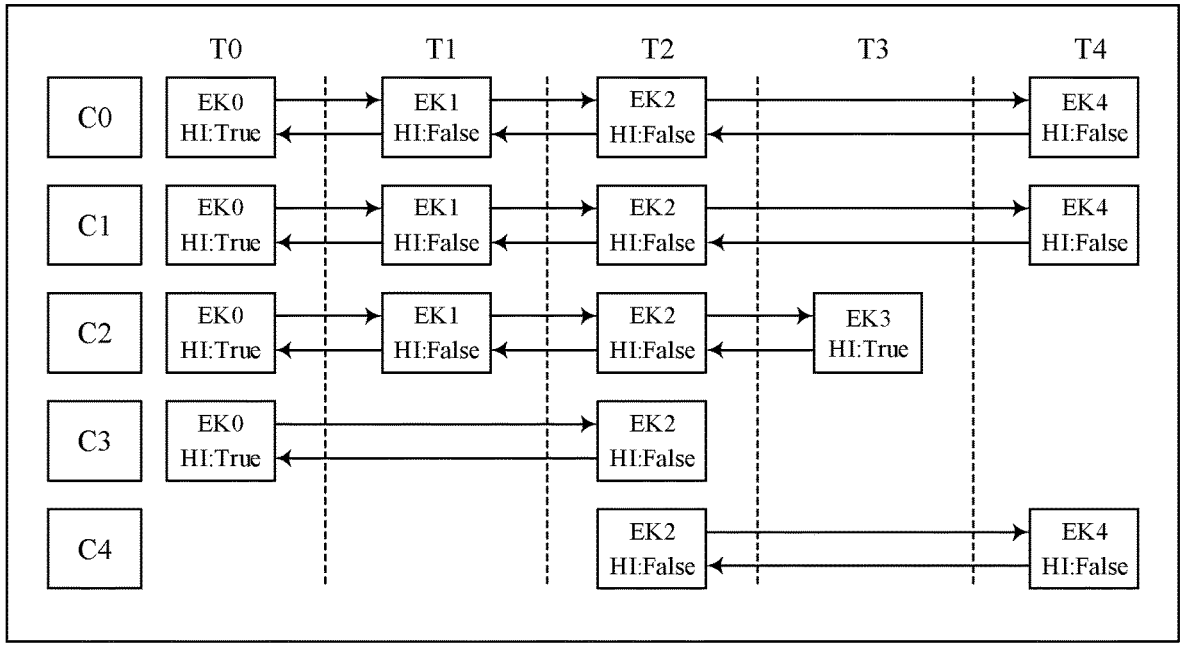
FIG. 4 illustrates an example of a message chain that supports user specific event threading in accordance with aspects of the present disclosure.

FIG. 4 illustrates an example of message chains 400 that supports user specific event threading in accordance with aspects of the present disclosure. The message chains 400 illustrates various threads of message for each participant in accordance with the techniques described herein. A query for the leading event for user C0 (after time T4) may return EK4, HI:false, and a query for the leading event for user C0 after T3 and before T4 may return EK2, HI:false, etc. These results may be based on identifying the first message in the thread that does not include the C0 in the HN field. Thus, leading edges may vary depending on which specific participants are used in a query and which point in time the query is received (or identified).

Figure 5:
FIG. 5 illustrates an example of a thread tracking table that supports user specific event threading in accordance with aspects of the present disclosure.

FIG. 5 illustrates an example of a thread tracking table 500 that supports user specific event threading in accordance with aspects of the present disclosure. The system may maintain the thread tracking table 500 for each thread (based on threadID), which may support providing information in response to queries.

The thread tracking table 500 includes an organization identifier (OrgID), ThreadID, time stamp, event type, hash, participant set, and hasInsight field for each event in a thread (e.g., each email). A thread tracking table 500 may be maintained for each thread, and may be used to provide an overview of the characteristics of the thread. Ins some cases, the table. The thread tracking table 500 shows, for a given threadID, the set of participants, the insights, etc.

Figure 6:
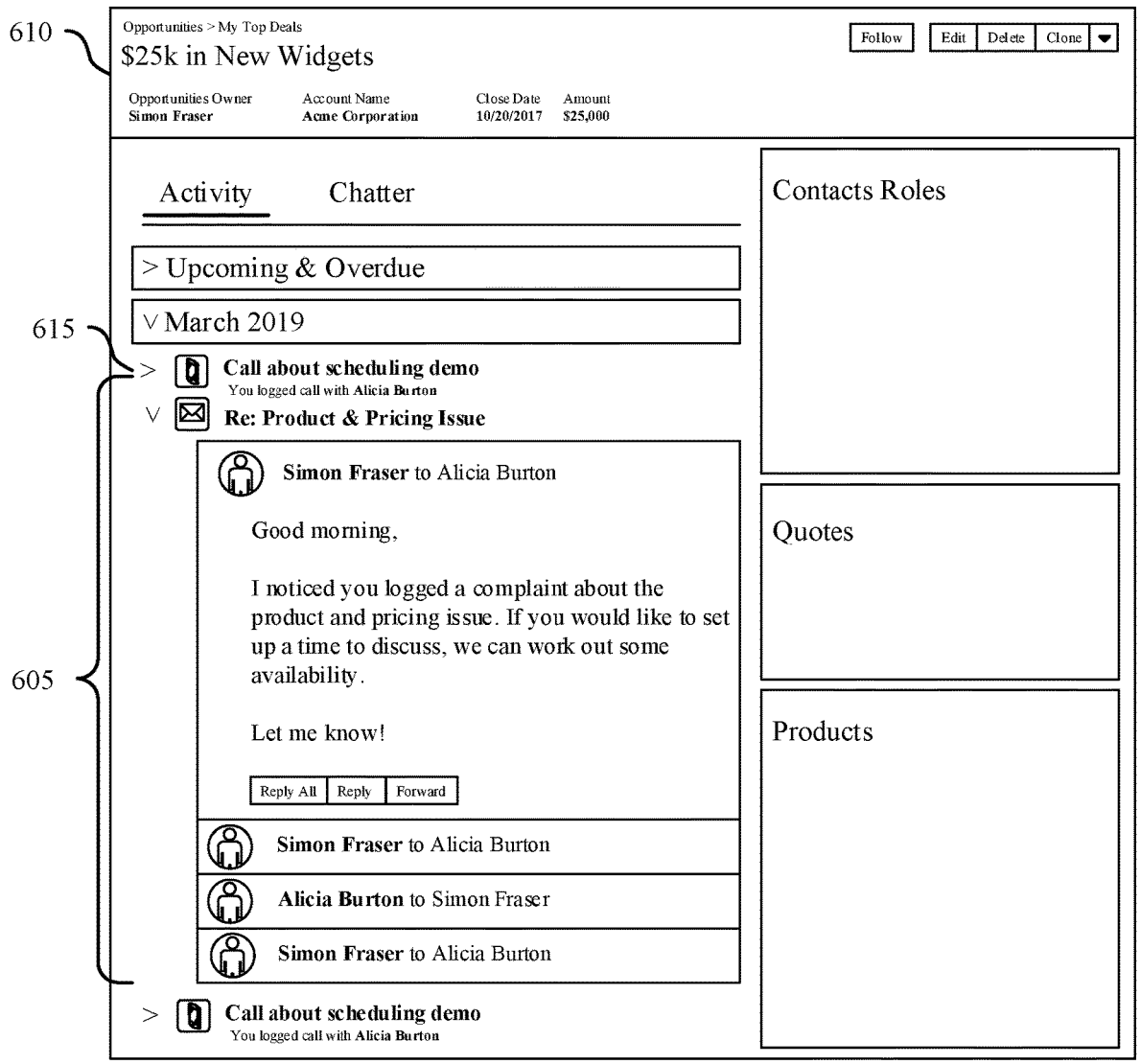
FIG. 6 illustrates an example of a user interface that supports user specific event threading in accordance with aspects of the present disclosure.

FIG. 6 illustrates an example of a user interface (UI) 600 that supports user specific event threading in accordance with aspects of the present disclosure. The UI 600 includes a leading edge event 605 corresponding to a participant (e.g., "Simon Fraser"), which may be retrieved according to aspects described herein. Simon Fraser may be an opportunity owner 610, which may be an example of a contact (e.g., contact 110 of FIG. 1) corresponding to a sales lead. The view displays the leading edge event 605 based on the opportunity owner 610, which is a participant to the thread. A user may select the UI control 615, to expand the thread, as illustrated at the UI 600. The selection may trigger the system as described herein to identify the chain of messages/events prior the leading edge event 605. This may be achieved by identifying each element (in a thread) prior to the leading edge event element that includes a target user identifier (e.g., the opportunity owner 610) in the next field of the element until an element does not include the target user in the previous field. That is, the system traverses the field while the elements include a next field with the target user and then stops when the previous field does not include the target user.

Figure 7:
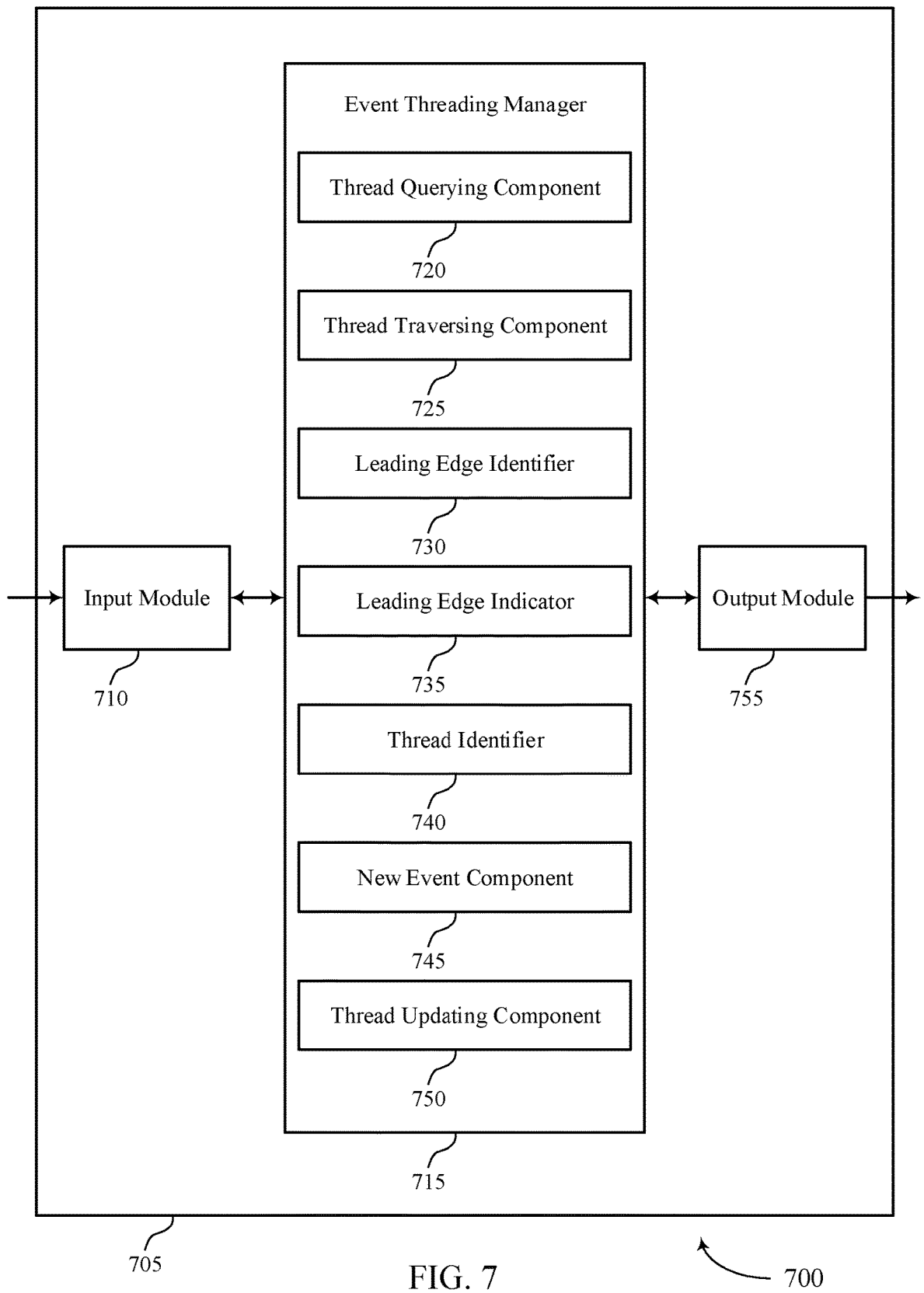
FIG. 7 shows a block diagram of an apparatus that supports user specific event threading in accordance with aspects of the present disclosure.

FIG. 7 shows a block diagram 700 of an apparatus 705 that supports user specific event threading in accordance with aspects of the present disclosure. The apparatus 705 may include an input module 710, an event threading manager 715, and an output module 755. The apparatus 705 may also include a processor. Each of these components may be in communication with one another (e.g., via one or more buses). In some cases, the apparatus 705 may be an example of a user terminal, a database server, or a system containing multiple computing devices.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the event threading manager 715 to support user specific event threading. In some cases, the input module 710 may be a component of an input/output (I/O) controller 915 as described with reference to FIG. 9.

The event threading manager 715 may include a thread querying component 720, a thread traversing component 725, a leading edge identifier 730, a leading edge indicator 735, a thread identifier 740, a new event component 745, and a thread updating component 750. The event threading manager 715 may be an example of aspects of the event threading manager 805 or 910 described with reference to FIGS. 8 and 9.

The event threading manager 715 and/or at least some of its various sub-components may be implemented in hardware, software executed by a processor, firmware, or any combination thereof. If implemented in software executed by a processor, the functions of the event threading manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The event threading manager 715 and/or at least some of its various sub-components may be physically located at various positions, including being distributed such that portions of functions are implemented at different physical locations by one or more physical devices. In some examples, the event threading manager 715 and/or at least some of its various sub-components may be a separate and distinct component in accordance with various aspects of the present disclosure. In other examples, the event threading manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The thread querying component 720 may receive a query for a leading edge event of a thread of events for a target user, where the thread of events is associated with a set of users and is organized such that each element in the thread of events corresponds to a respective event and includes at least a next field that includes a first subset of the set of users and a previous field that includes a second subset of the set of users.

The thread traversing component 725 may identify, starting with a latest element in the thread of events arranged in a chronological order, a first element that does not include the target user in the first subset of the set of users in the next field.

The leading edge identifier 730 may identify, as the leading edge event for the target user, an event corresponding to the first element that does not include the target user in the first subset of the set of users.

The leading edge indicator 735 may transmit an indication of the leading edge event of the thread of events based on the query.

The thread identifier 740 may identify a first element of a thread of events based on a first event associated with a set of user identifiers, where the first element includes a respective next field.

The new event component 745 may add, for each subsequent event associated with at least a subset of the set of user identifiers, a new element in the thread of events, each new element including the respective next field and a respective previous field, where the respective previous field of the new element includes one or more of the set of user identifiers that are associated with at least one prior event to the new element in the thread of events.

The thread updating component 750 may update, based on adding the new element, the respective next field of each element of the thread of events such that the respective next field includes one or more of the set of user identifiers that are associated with at least one subsequent event to a current element in the thread of events.

The output module 755 may manage output signals for the apparatus 705. For example, the output module 755 may receive signals from other components of the apparatus 705, such as the event threading manager 715, and may transmit these signals to other components or devices. In some specific examples, the output module 755 may transmit output signals for display in a user interface, for storage in a database or data store, for further processing at a server or server cluster, or for any other processes at any number of devices or systems. In some cases, the output module 755 may be a component of an I/O controller 915 as described with reference to FIG. 9.

Figure 8:
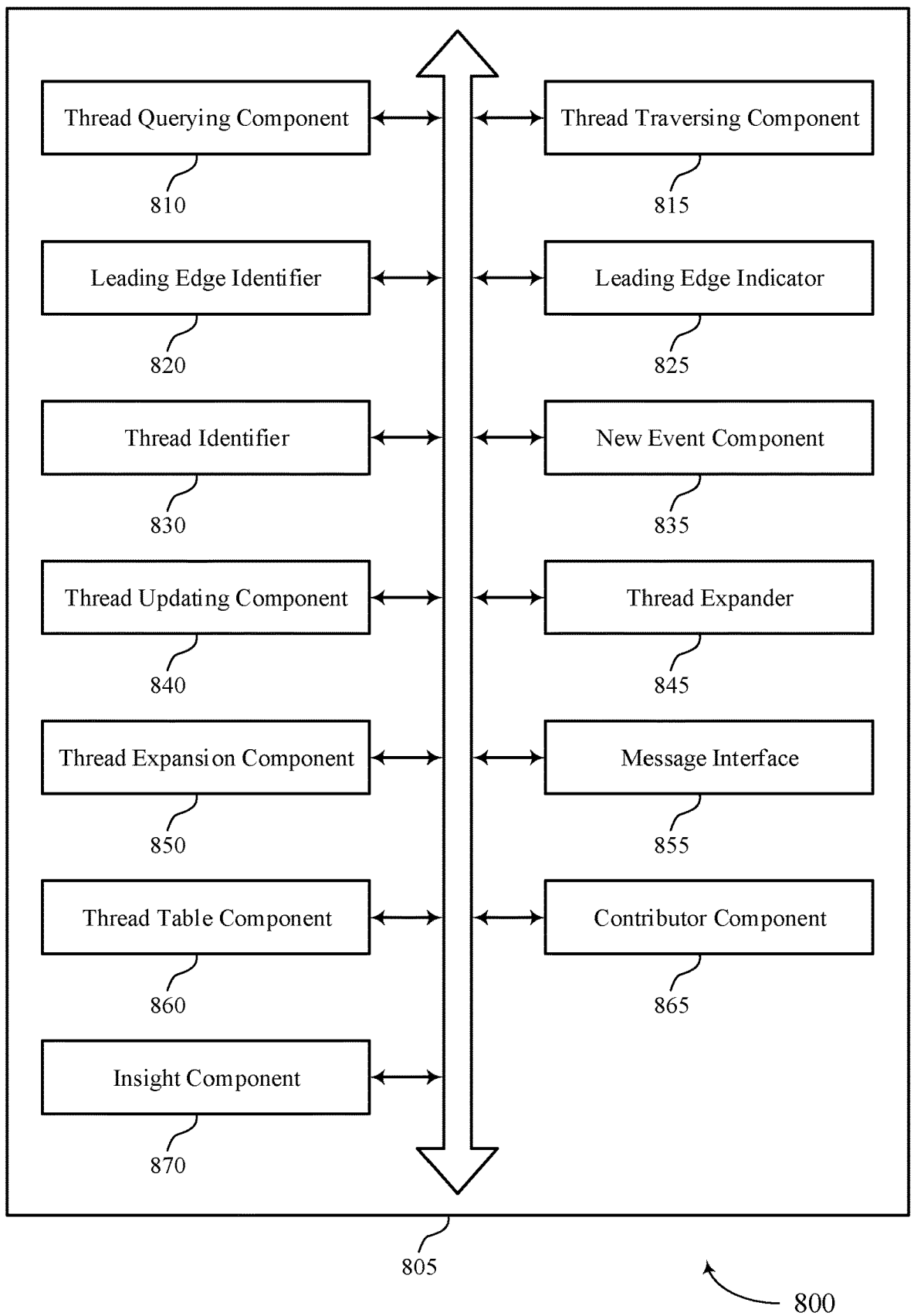
FIG. 8 shows a block diagram of an event threading manager that supports user specific event threading in accordance with aspects of the present disclosure.

FIG. 8 shows a block diagram 800 of an event threading manager 805 that supports user specific event threading in accordance with aspects of the present disclosure. The event threading manager 805 may be an example of aspects of an event threading manager 715 or an event threading manager 910 described herein. The event threading manager 805 may include a thread querying component 810, a thread traversing component 815, a leading edge identifier 820, a leading edge indicator 825, a thread identifier 830, a new event component 835, a thread updating component 840, a thread expander 845, a thread expansion component 850, a message interface 855, a thread table component 860, a contributor component 865, and an insight component 870. Each of these modules may communicate, directly or indirectly, with one another (e.g., via one or more buses).

The thread querying component 810 may receive a query for a leading edge event of a thread of events for a target user, where the thread of events is associated with a set of users and is organized such that each element in the thread of events corresponds to a respective event and includes at least a next field that includes a first subset of the set of users and a previous field that includes a second subset of the set of users.

In some examples, the thread querying component 810 may receive a query for a leading edge event of the thread of events for a target user of the set of user identifiers, where the query indicates the target user.

The thread traversing component 815 may identify, starting with a latest element in the thread of events arranged in a chronological order, a first element that does not include the target user in the first subset of the set of users in the next field.

In some examples, the thread traversing component 815 may identify, starting with a latest element in the thread of events arranged in a chronological order, a first element that does not include the target user in the respective next field.

In some examples, the thread traversing component 815 may identify each element prior to the first element corresponding to the leading edge event that includes the target user in the next field until an element does not include the target user in the previous field.

The leading edge identifier 820 may identify, as the leading edge event for the target user, an event corresponding to the first element that does not include the target user in the first subset of the set of users.

In some examples, the leading edge identifier 820 may identify, as the leading edge event for the target user, an event corresponding to the first element that does not include the target user in the respective next field.

The leading edge indicator 825 may transmit an indication of the leading edge event of the thread of events based on the query.

In some examples, the leading edge indicator 825 may transmit an indication of the leading edge event of the thread of events based on the query.

The thread identifier 830 may identify a first element of a thread of events based on a first event associated with a set of user identifiers, where the first element includes a respective next field.

In some examples, the thread identifier 830 may identify the thread of events using the thread identifier.

In some cases, each event corresponds to a meeting, an email, a message, or a phone call.

The new event component 835 may add, for each subsequent event associated with at least a subset of the set of user identifiers, a new element in the thread of events, each new element including the respective next field and a respective previous field, where the respective previous field of the new element includes one or more of the set of user identifiers that are associated with at least one prior event to the new element in the thread of events.

In some examples, the new event component 835 may receive an indication of a new event including at least a subset of the set of user identifiers, where the new event is associated with the thread of events in accordance with a thread identifier.

In some examples, the new event component 835 may add, to the thread of events, a new element corresponding to the new event, where the new element includes the respective previous field including one or more of the set of user identifiers that are associated with at least one prior event to the new element in the thread of events.

The thread updating component 840 may update, based on adding the new element, the respective next field of each element of the thread of events such that the respective next field includes one or more of the set of user identifiers that are associated with at least one subsequent event to a current element in the thread of events.

In some examples, the thread updating component 840 may update, based on adding the new element to the new event, the respective next field of each element of the thread of events such that the respective next field includes one or more of the set of user identifiers that are associated with at least one subsequent event to the current element in the thread of events.

The thread expander 845 may receive an indication to expand the leading edge event for the target user to a thread for the target user.

The thread expansion component 850 may transmit an indication of each element as the thread for the target user.

The message interface 855 may detect transmission of a new message between one or more of the set of user identifiers.

The thread table component 860 may store a table in association with the thread of events, where the table includes a summary of the thread of events.

The contributor component 865 may include, in each element of the thread of events, a respective contributor field that includes one or more of the plurality of user identifiers that includes user identifiers of the plurality of user identifiers that either contributed to an event of a current element or an event prior to the current element.

In some cases, each element of the thread of events further includes a respective contributor field that includes one or more of the set of user identifiers that includes user identifiers of the set of user identifiers that either contributed to an event of a current element or an event prior to the current element.

The insight component 870 may include, in each element of the thread of events, an insight field indicating one or more of the plurality of user identifiers based on which users of the plurality of user identifiers were a contributor to an event corresponding to a current element with an insight or any prior element corresponding to an event with an insight.

In some cases, each element of the thread of events further includes an insight field indicating one or more of the set of user identifiers based on which users of the set of user identifiers were a contributor to an event corresponding to a current element with an insight or any prior element corresponding to an event with an insight.

Figure 9:
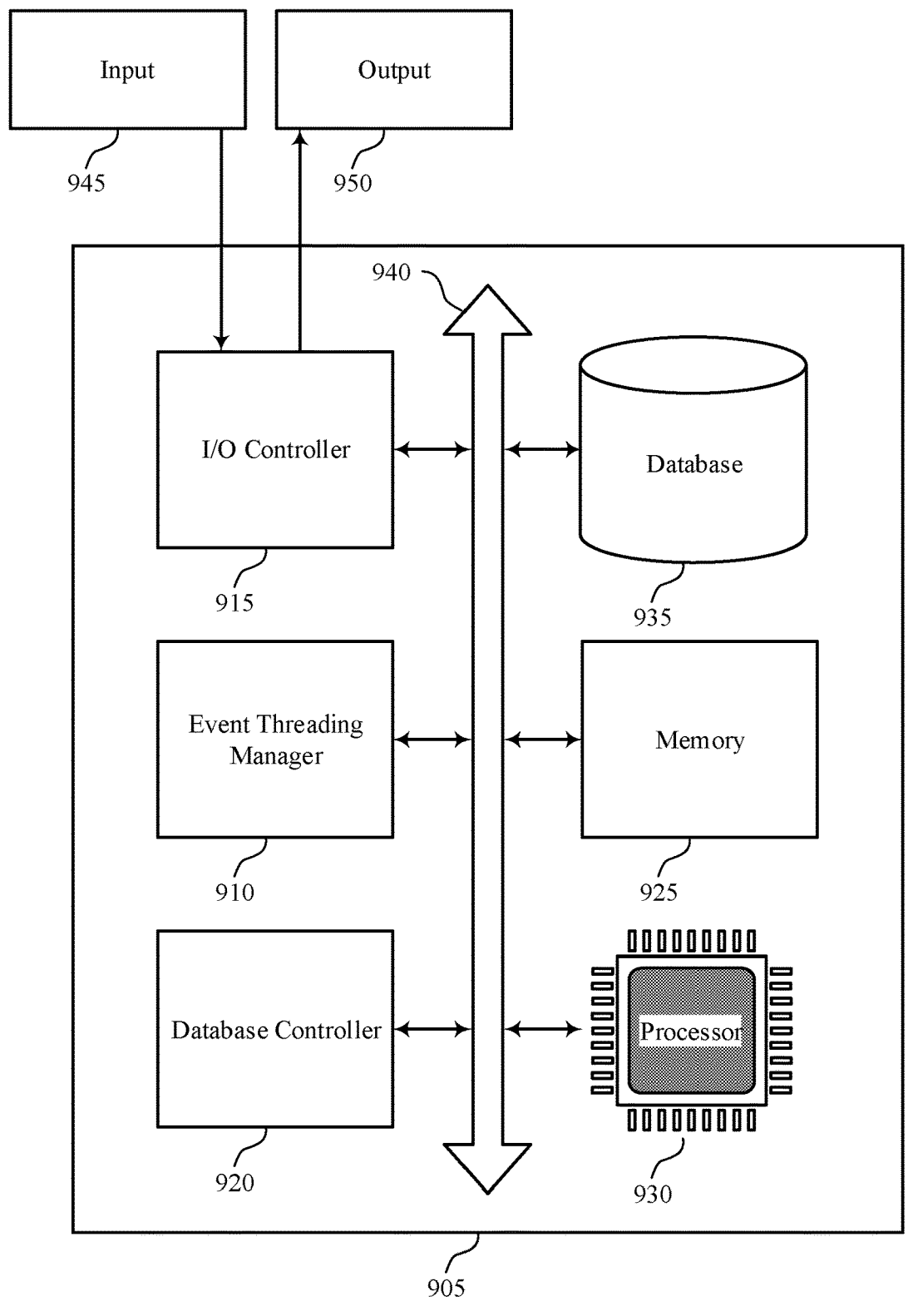
FIG. 9 shows a diagram of a system including a device that supports user specific event threading in accordance with aspects of the present disclosure.

FIG. 9 shows a diagram of a system 900 including a device 905 that supports user specific event threading in accordance with aspects of the present disclosure. The device 905 may be an example of or include the components of a database server or an apparatus 705 as described herein. The device 905 may include components for bi-directional data communications including components for transmitting and receiving communications, including an event threading manager 910, an I/O controller 915, a database controller 920, memory 925, a processor 930, and a database 935. These components may be in electronic communication via one or more buses (e.g., bus 940).

The event threading manager 910 may be an example of an event threading manager 715 or 805 as described herein. For example, the event threading manager 910 may perform any of the methods or processes described above with reference to FIGS. 7 and 8. In some cases, the event threading manager 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic input/output system (BIOS) which may control basic hardware or software operation such as the interaction with peripheral components or devices.

The processor 930 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting user specific event threading).

Figure 10:
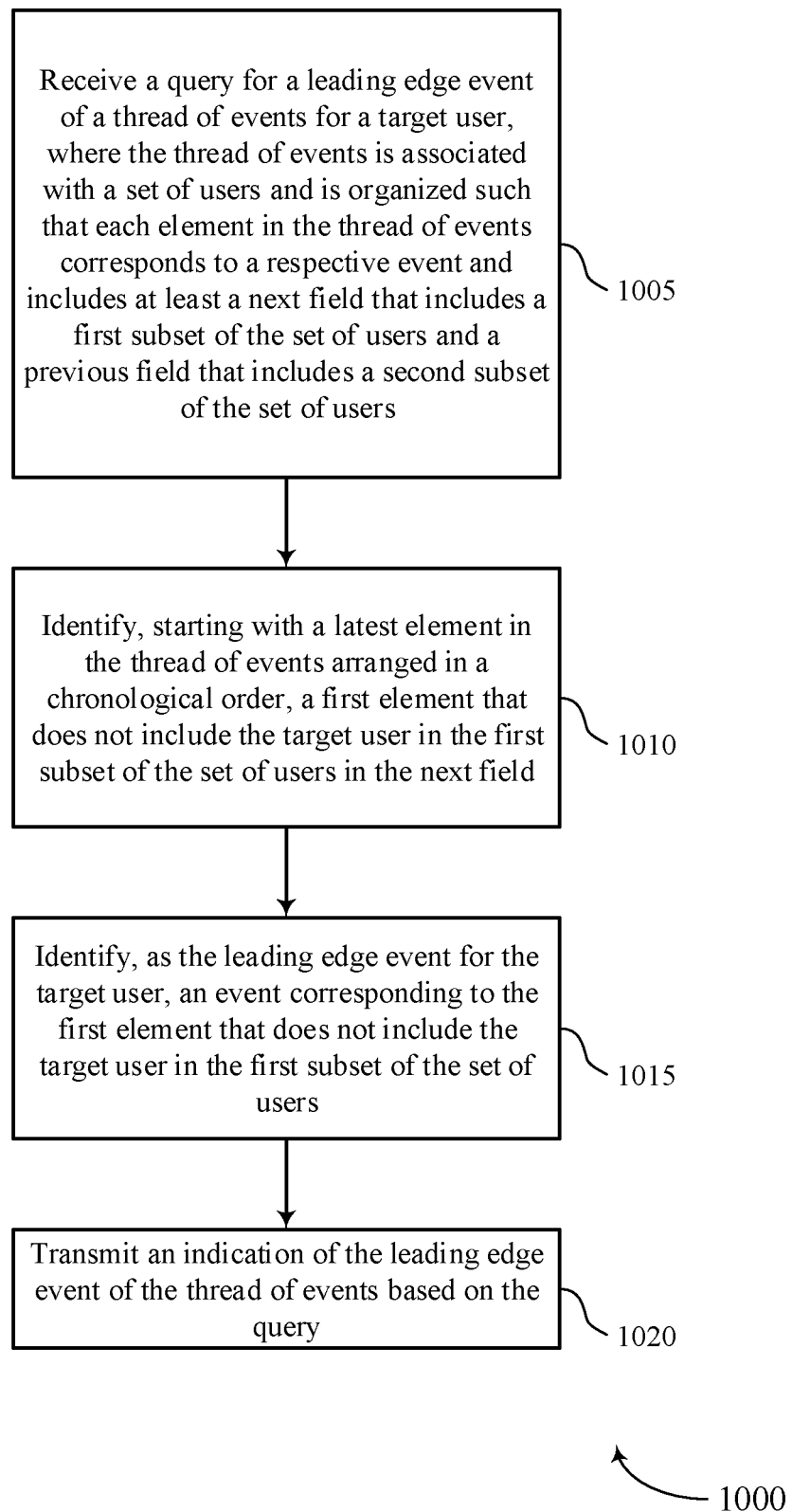
FIGS. 10 through 13 show flowcharts illustrating methods that support user specific event threading in accordance with aspects of the present disclosure.

FIG. 10 shows a flowchart illustrating a method 1000 that supports user specific event threading in accordance with aspects of the present disclosure. The operations of method 1000 may be implemented by a database server or its components as described herein. For example, the operations of method 1000 may be performed by an event threading manager as described with reference to FIGS. 7 through 9. In some examples, a database server may execute a set of instructions to control the functional elements of the database server to perform the functions described below. Additionally or alternatively, a database server may perform aspects of the functions described below using special-purpose hardware.

At 1005, the database server may receive a query for a leading edge event of a thread of events for a target user, where the thread of events is associated with a set of users and is organized such that each element in the thread of events corresponds to a respective event and includes at least a next field that includes a first subset of the set of users and a previous field that includes a second subset of the set of users. The operations of 1005 may be performed according to the methods described herein. In some examples, aspects of the operations of 1005 may be performed by a thread querying component as described with reference to FIGS. 7 through 9.

At 1010, the database server may identify, starting with a latest element in the thread of events arranged in a chronological order, a first element that does not include the target user in the first subset of the set of users in the next field. The operations of 1010 may be performed according to the methods described herein. In some examples, aspects of the operations of 1010 may be performed by a thread traversing component as described with reference to FIGS. 7 through 9.

At 1015, the database server may identify, as the leading edge event for the target user, an event corresponding to the first element that does not include the target user in the first subset of the set of users. The operations of 1015 may be performed according to the methods described herein. In some examples, aspects of the operations of 1015 may be performed by a leading edge identifier as described with reference to FIGS. 7 through 9.

At 1020, the database server may transmit an indication of the leading edge event of the thread of events based on the query. The operations of 1020 may be performed according to the methods described herein. In some examples, aspects of the operations of 1020 may be performed by a leading edge indicator as described with reference to FIGS. 7 through 9.

Figure 11:
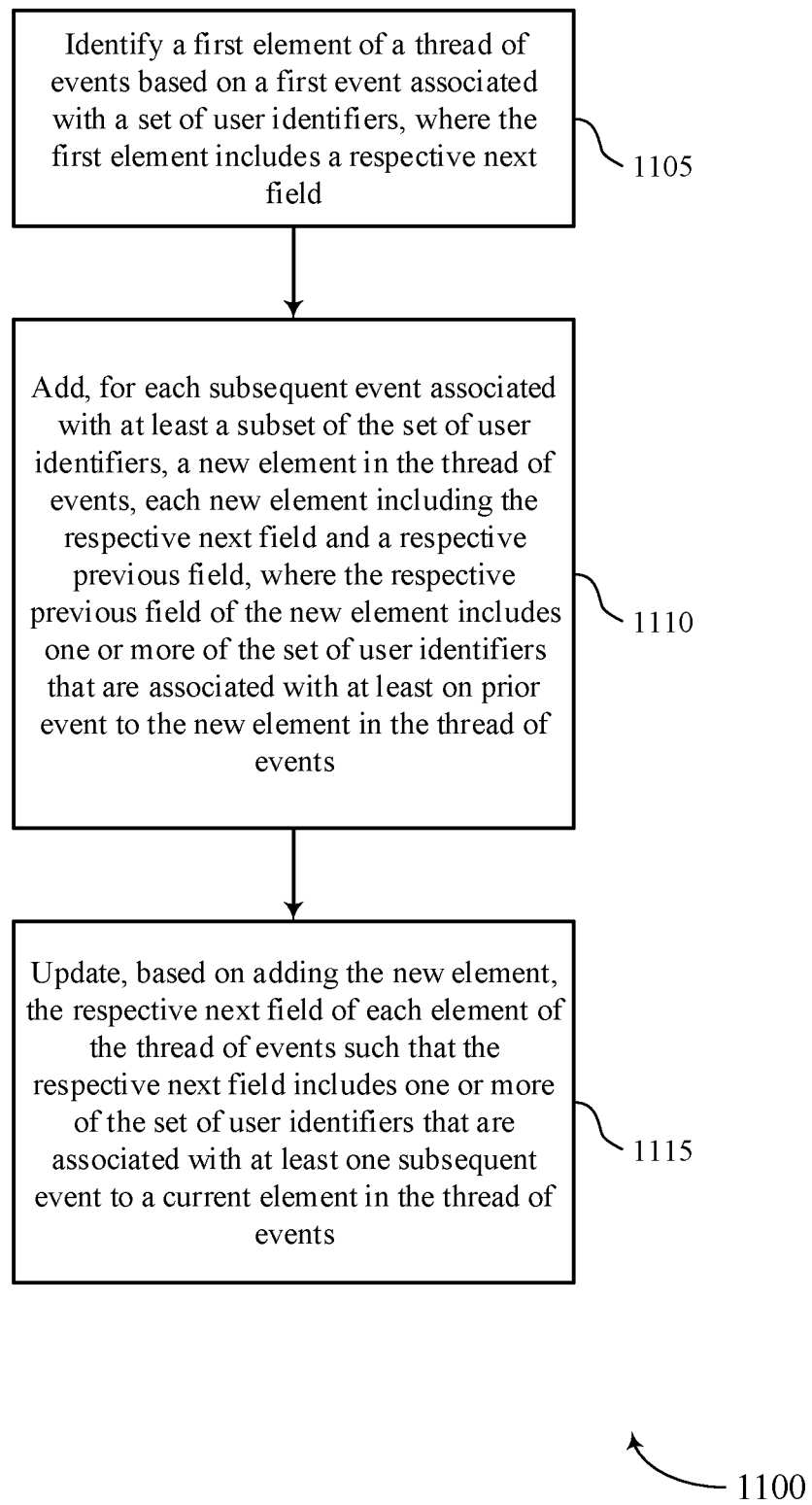

FIG. 11 shows a flowchart illustrating a method 1100 that supports user specific event threading in accordance with aspects of the present disclosure. The operations of method 1100 may be implemented by a database server or its components as described herein. For example, the operations of method 1100 may be performed by an event threading manager as described with reference to FIGS. 7 through 9. In some examples, a database server may execute a set of instructions to control the functional elements of the database server to perform the functions described below. Additionally or alternatively, a database server may perform aspects of the functions described below using special-purpose hardware.

At 1105, the database server may identify a first element of a thread of events based on a first event associated with a set of user identifiers, where the first element includes a respective next field. The operations of 1105 may be performed according to the methods described herein. In some examples, aspects of the operations of 1105 may be performed by a thread identifier as described with reference to FIGS. 7 through 9.

At 1110, the database server may add, for each subsequent event associated with at least a subset of the set of user identifiers, a new element in the thread of events, each new element including the respective next field and a respective previous field, where the respective previous field of the new element includes one or more of the set of user identifiers that are associated with at least one prior event to the new element in the thread of events. The operations of 1110 may be performed according to the methods described herein. In some examples, aspects of the operations of 1110 may be performed by a new event component as described with reference to FIGS. 7 through 9.

At 1115, the database server may update, based on adding the new element, the respective next field of each element of the thread of events such that the respective next field includes one or more of the set of user identifiers that are associated with at least one subsequent event to a current element in the thread of events. The operations of 1115 may be performed according to the methods described herein. In some examples, aspects of the operations of 1115 may be performed by a thread updating component as described with reference to FIGS. 7 through 9.

Figure 12:
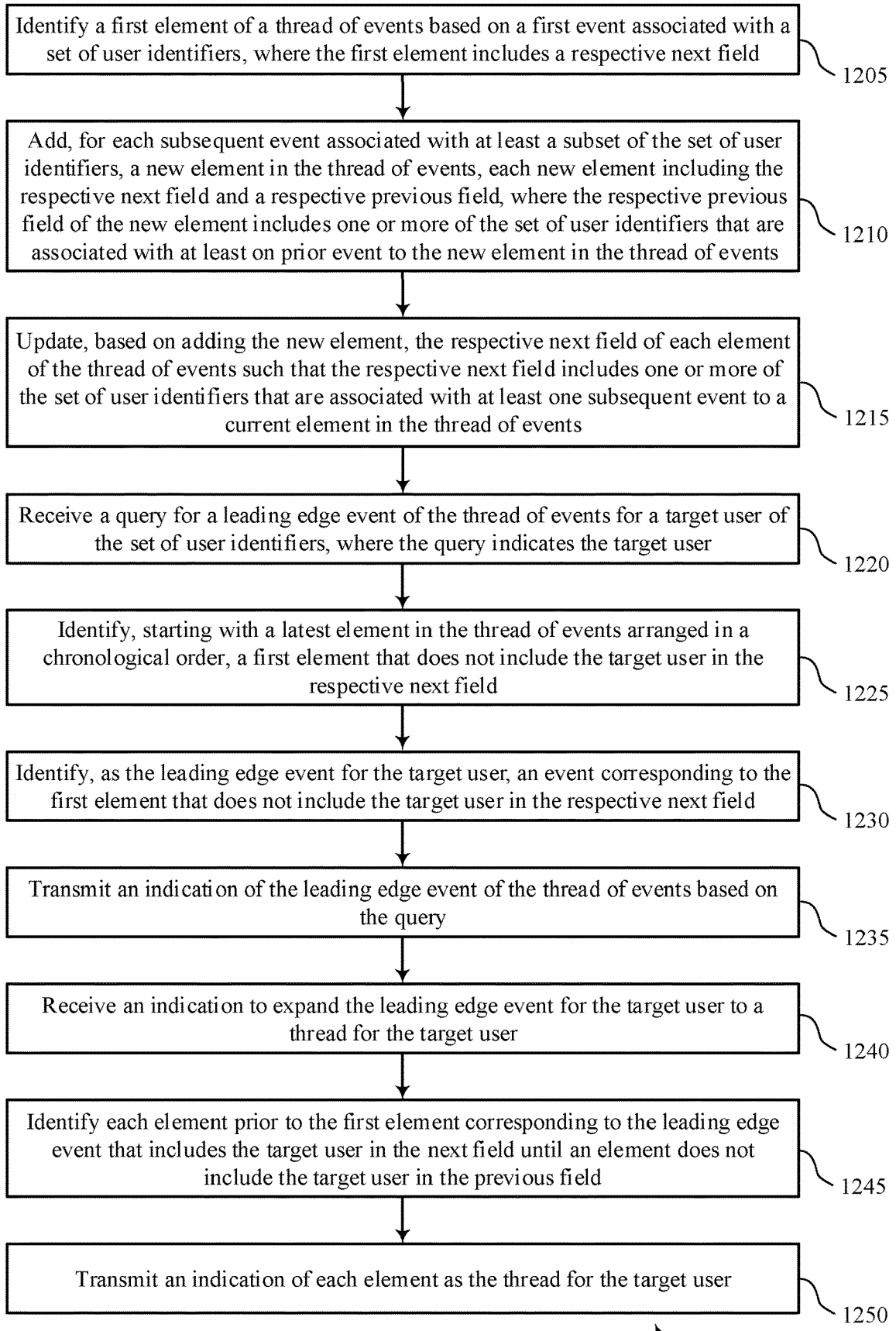

FIG. 12 shows a flowchart illustrating a method 1200 that supports user specific event threading in accordance with aspects of the present disclosure. The operations of method 1200 may be implemented by a database server or its components as described herein. For example, the operations of method 1200 may be performed by an event threading manager as described with reference to FIGS. 7 through 9. In some examples, a database server may execute a set of instructions to control the functional elements of the database server to perform the functions described below. Additionally or alternatively, a database server may perform aspects of the functions described below using special-purpose hardware.

At 1205, the database server may identify a first element of a thread of events based on a first event associated with a set of user identifiers, where the first element includes a respective next field. The operations of 1205 may be performed according to the methods described herein. In some examples, aspects of the operations of 1205 may be performed by a thread identifier as described with reference to FIGS. 7 through 9.

At 1210, the database server may add, for each subsequent event associated with at least a subset of the set of user identifiers, a new element in the thread of events, each new element including the respective next field and a respective previous field, where the respective previous field of the new element includes one or more of the set of user identifiers that are associated with at least one prior event to the new element in the thread of events. The operations of 1210 may be performed according to the methods described herein. In some examples, aspects of the operations of 1210 may be performed by a new event component as described with reference to FIGS. 7 through 9.

At 1215, the database server may update, based on adding the new element, the respective next field of each element of the thread of events such that the respective next field includes one or more of the set of user identifiers that are associated with at least one subsequent event to a current element in the thread of events. The operations of 1215 may be performed according to the methods described herein. In some examples, aspects of the operations of 1215 may be performed by a thread updating component as described with reference to FIGS. 7 through 9.

At 1220, the database server may receive a query for a leading edge event of the thread of events for a target user of the set of user identifiers, where the query indicates the target user. The operations of 1220 may be performed according to the methods described herein. In some examples, aspects of the operations of 1220 may be performed by a thread querying component as described with reference to FIGS. 7 through 9.

At 1225, the database server may identify, starting with a latest element in the thread of events arranged in a chronological order, a first element that does not include the target user in the respective next field. The operations of 1225 may be performed according to the methods described herein. In some examples, aspects of the operations of 1225 may be performed by a thread traversing component as described with reference to FIGS. 7 through 9.

At 1230, the database server may identify, as the leading edge event for the target user, an event corresponding to the first element that does not include the target user in the respective next field. The operations of 1230 may be performed according to the methods described herein. In some examples, aspects of the operations of 1230 may be performed by a leading edge identifier as described with reference to FIGS. 7 through 9.

At 1235, the database server may transmit an indication of the leading edge event of the thread of events based on the query. The operations of 1235 may be performed according to the methods described herein. In some examples, aspects of the operations of 1235 may be performed by a leading edge indicator as described with reference to FIGS. 7 through 9.

At 1240, the database server may receive an indication to expand the leading edge event for the target user to a thread for the target user. The operations of 1240 may be performed according to the methods described herein. In some examples, aspects of the operations of 1240 may be performed by a thread expander as described with reference to FIGS. 7 through 9.

At 1245, the database server may identify each element prior to the first element corresponding to the leading edge event that includes the target user in the next field until an element does not include the target user in the previous field. The operations of 1245 may be performed according to the methods described herein. In some examples, aspects of the operations of 1245 may be performed by a thread traversing component as described with reference to FIGS. 7 through 9.

At 1250, the database server may transmit an indication of each element as the thread for the target user. The operations of 1250 may be performed according to the methods described herein. In some examples, aspects of the operations of 1250 may be performed by a thread expansion component as described with reference to FIGS. 7 through 9.

Figure 13:
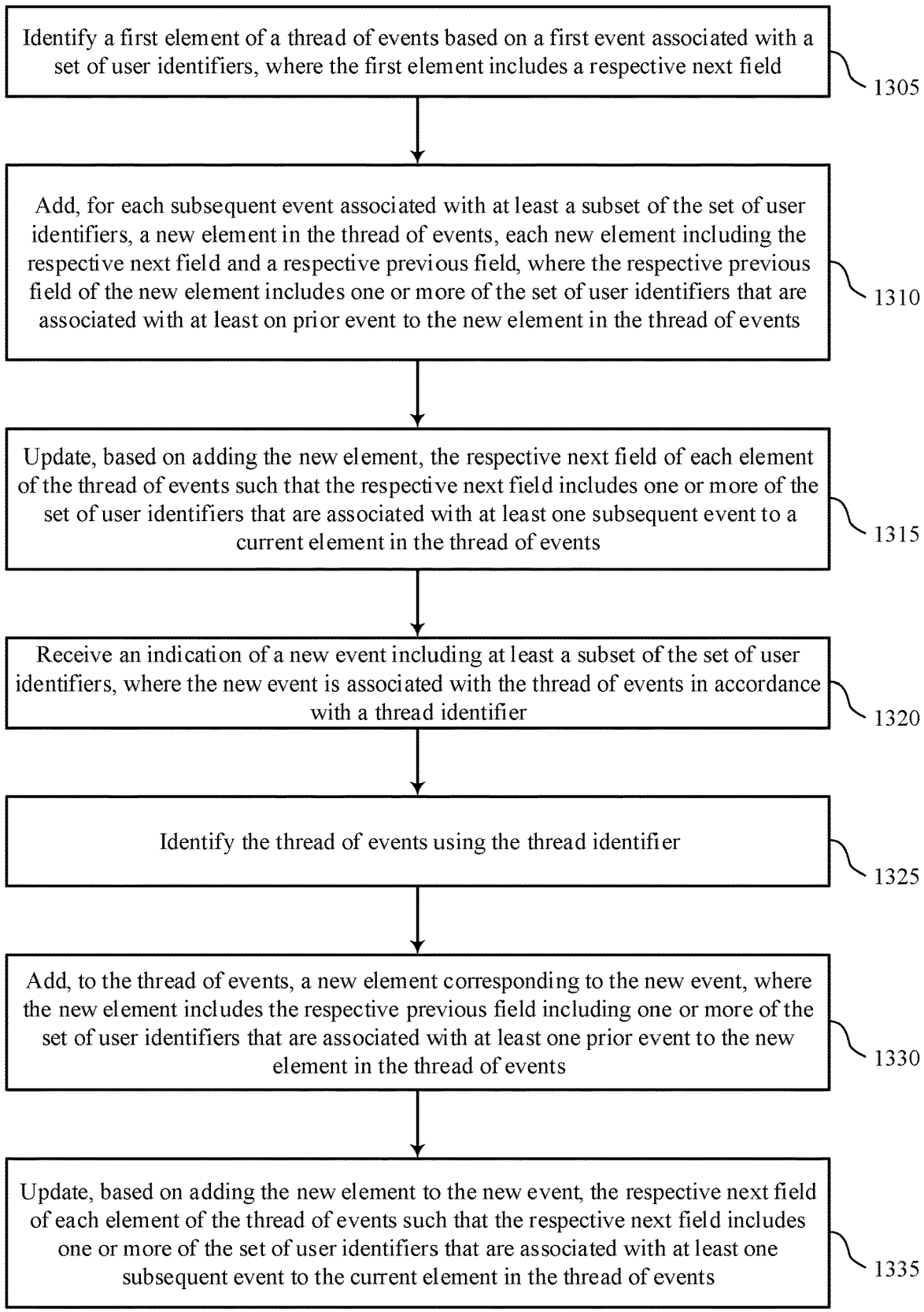

FIG. 13 shows a flowchart illustrating a method 1300 that supports user specific event threading in accordance with aspects of the present disclosure. The operations of method 1300 may be implemented by a database server or its components as described herein. For example, the operations of method 1300 may be performed by an event threading manager as described with reference to FIGS. 7 through 9. In some examples, a database server may execute a set of instructions to control the functional elements of the database server to perform the functions described below. Additionally or alternatively, a database server may perform aspects of the functions described below using special-purpose hardware.

At 1305, the database server may identify a first element of a thread of events based on a first event associated with a set of user identifiers, where the first element includes a respective next field. The operations of 1305 may be performed according to the methods described herein. In some examples, aspects of the operations of 1305 may be performed by a thread identifier as described with reference to FIGS. 7 through 9.

At 1310, the database server may add, for each subsequent event associated with at least a subset of the set of user identifiers, a new element in the thread of events, each new element including the respective next field and a respective previous field, where the respective previous field of the new element includes one or more of the set of user identifiers that are associated with at least one prior event to the new element in the thread of events. The operations of 1310 may be performed according to the methods described herein. In some examples, aspects of the operations of 1310 may be performed by a new event component as described with reference to FIGS. 7 through 9.

At 1315, the database server may update, based on adding the new element, the respective next field of each element of the thread of events such that the respective next field includes one or more of the set of user identifiers that are associated with at least one subsequent event to a current element in the thread of events. The operations of 1315 may be performed according to the methods described herein. In some examples, aspects of the operations of 1315 may be performed by a thread updating component as described with reference to FIGS. 7 through 9.

At 1320, the database server may receive an indication of a new event including at least a subset of the set of user identifiers, where the new event is associated with the thread of events in accordance with a thread identifier. The operations of 1320 may be performed according to the methods described herein. In some examples, aspects of the operations of 1320 may be performed by a new event component as described with reference to FIGS. 7 through 9.

At 1325, the database server may identify the thread of events using the thread identifier. The operations of 1325 may be performed according to the methods described herein. In some examples, aspects of the operations of 1325 may be performed by a thread identifier as described with reference to FIGS. 7 through 9.

At 1330, the database server may add, to the thread of events, a new element corresponding to the new event, where the new element includes the respective previous field including one or more of the set of user identifiers that are associated with at least one prior event to the new element in the thread of events. The operations of 1330 may be performed according to the methods described herein. In some examples, aspects of the operations of 1330 may be performed by a new event component as described with reference to FIGS. 7 through 9.

At 1335, the database server may update, based on adding the new element to the new event, the respective next field of each element of the thread of events such that the respective next field includes one or more of the set of user identifiers that are associated with at least one subsequent event to the current element in the thread of events. The operations of 1335 may be performed according to the methods described herein. In some examples, aspects of the operations of 1335 may be performed by a thread updating component as described with reference to FIGS. 7 through 9.

A method of data processing is described. The method may include receiving a query for a leading edge event of a thread of events for a target user, where the thread of events is associated with a set of users and is organized such that each element in the thread of events corresponds to a respective event and includes at least a next field that includes a first subset of the set of users and a previous field that includes a second subset of the set of users, identifying, starting with a latest element in the thread of events arranged in a chronological order, a first element that does not include the target user in the first subset of the set of users in the next field, identifying, as the leading edge event for the target user, an event corresponding to the first element that does not include the target user in the first subset of the set of users, and transmitting an indication of the leading edge event of the thread of events based on the query.

An apparatus for data processing is described. The apparatus may include a processor, memory coupled with the processor, and instructions stored in the memory. The instructions may be executable by the processor to cause the apparatus to receive a query for a leading edge event of a thread of events for a target user, where the thread of events is associated with a set of users and is organized such that each element in the thread of events corresponds to a respective event and includes at least a next field that includes a first subset of the set of users and a previous field that includes a second subset of the set of users, identify, starting with a latest element in the thread of events arranged in a chronological order, a first element that does not include the target user in the first subset of the set of users in the next field, identify, as the leading edge event for the target user, an event corresponding to the first element that does not include the target user in the first subset of the set of users, and transmit an indication of the leading edge event of the thread of events based on the query.

Another apparatus for data processing is described. The apparatus may include means for receiving a query for a leading edge event of a thread of events for a target user, where the thread of events is associated with a set of users and is organized such that each element in the thread of events corresponds to a respective event and includes at least a next field that includes a first subset of the set of users and a previous field that includes a second subset of the set of users, identifying, starting with a latest element in the thread of events arranged in a chronological order, a first element that does not include the target user in the first subset of the set of users in the next field, identifying, as the leading edge event for the target user, an event corresponding to the first element that does not include the target user in the first subset of the set of users, and transmitting an indication of the leading edge event of the thread of events based on the query.

A non-transitory computer-readable medium storing code for data processing is described. The code may include instructions executable by a processor to receive a query for a leading edge event of a thread of events for a target user, where the thread of events is associated with a set of users and is organized such that each element in the thread of events corresponds to a respective event and includes at least a next field that includes a first subset of the set of users and a previous field that includes a second subset of the set of users, identify, starting with a latest element in the thread of events arranged in a chronological order, a first element that does not include the target user in the first subset of the set of users in the next field, identify, as the leading edge event for the target user, an event corresponding to the first element that does not include the target user in the first subset of the set of users, and transmit an indication of the leading edge event of the thread of events based on the query.

A method of data processing is described. The method may include identifying a first element of a thread of events based on a first event associated with a set of user identifiers, where the first element includes a respective next field, adding, for each subsequent event associated with at least a subset of the set of user identifiers, a new element in the thread of events, each new element including the respective next field and a respective previous field, where the respective previous field of the new element includes one or more of the set of user identifiers that are associated with at least one prior event to the new element in the thread of events, and updating, based on adding the new element, the respective next field of each element of the thread of events such that the respective next field includes one or more of the set of user identifiers that are associated with at least one subsequent event to a current element in the thread of events.

An apparatus for data processing is described. The apparatus may include a processor, memory coupled with the processor, and instructions stored in the memory. The instructions may be executable by the processor to cause the apparatus to identify a first element of a thread of events based on a first event associated with a set of user identifiers, where the first element includes a respective next field, add, for each subsequent event associated with at least a subset of the set of user identifiers, a new element in the thread of events, each new element including the respective next field and a respective previous field, where the respective previous field of the new element includes one or more of the set of user identifiers that are associated with at least one prior event to the new element in the thread of events, and update, based on adding the new element, the respective next field of each element of the thread of events such that the respective next field includes one or more of the set of user identifiers that are associated with at least one subsequent event to a current element in the thread of events.

Another apparatus for data processing is described. The apparatus may include means for identifying a first element of a thread of events based on a first event associated with a set of user identifiers, where the first element includes a respective next field, adding, for each subsequent event associated with at least a subset of the set of user identifiers, a new element in the thread of events, each new element including the respective next field and a respective previous field, where the respective previous field of the new element includes one or more of the set of user identifiers that are associated with at least one prior event to the new element in the thread of events, and updating, based on adding the new element, the respective next field of each element of the thread of events such that the respective next field includes one or more of the set of user identifiers that are associated with at least one subsequent event to a current element in the thread of events.

A non-transitory computer-readable medium storing code for data processing is described. The code may include instructions executable by a processor to identify a first element of a thread of events based on a first event associated with a set of user identifiers, where the first element includes a respective next field, add, for each subsequent event associated with at least a subset of the set of user identifiers, a new element in the thread of events, each new element including the respective next field and a respective previous field, where the respective previous field of the new element includes one or more of the set of user identifiers that are associated with at least one prior event to the new element in the thread of events, and update, based on adding the new element, the respective next field of each element of the thread of events such that the respective next field includes one or more of the set of user identifiers that are associated with at least one subsequent event to a current element in the thread of events.

Some examples of the method, apparatuses, and non-transitory computer-readable medium described herein may further include operations, features, means, or instructions for receiving a query for a leading edge event of the thread of events for a target user of the set of user identifiers, where the query indicates the target user, identifying, starting with a latest element in the thread of events arranged in a chronological order, a first element that does not include the target user in the respective next field, identifying, as the leading edge event for the target user, an event corresponding to the first element that does not include the target user in the respective next field, and transmitting an indication of the leading edge event of the thread of events based on the query.

Some examples of the method, apparatuses, and non-transitory computer-readable medium described herein may further include operations, features, means, or instructions for receiving an indication to expand the leading edge event for the target user to a thread for the target user, identifying each element prior to the first element corresponding to the leading edge event that includes the target user in the next field until an element does not include the target user in the previous field, and transmitting an indication of each element as the thread for the target user.

Some examples of the method, apparatuses, and non-transitory computer-readable medium described herein may further include operations, features, means, or instructions for receiving an indication of a new event including at least a subset of the set of user identifiers, where the new event may be associated with the thread of events in accordance with a thread identifier, identifying the thread of events using the thread identifier, adding, to the thread of events, a new element corresponding to the new event, where the new element includes the respective previous field including one or more of the set of user identifiers that may be associated with at least one prior event to the new element in the thread of events, and updating, based on adding the new element to the new event, the respective next field of each element of the thread of events such that the respective next field includes one or more of the set of user identifiers that may be associated with at least one subsequent event to the current element in the thread of events.

In some examples of the method, apparatuses, and non-transitory computer-readable medium described herein, receiving the indication of the new event may include operations, features, means, or instructions for detecting transmission of a new message between one or more of the set of user identifiers.

Some examples of the method, apparatuses, and non-transitory computer-readable medium described herein may further include operations, features, means, or instructions for storing a table in association with the thread of events, where the table includes a summary of the thread of events.

In some examples of the method, apparatuses, and non-transitory computer-readable medium described herein, each event corresponds to a meeting, an email, a message, or a phone call.

In some examples of the method, apparatuses, and non-transitory computer-readable medium described herein, each element of the thread of events further includes a respective contributor field that includes one or more of the set of user identifiers that includes user identifiers of the set of user identifiers that either contributed to an event of a current element or an event prior to the current element.

In some examples of the method, apparatuses, and non-transitory computer-readable medium described herein, each element of the thread of events further includes an insight field indicating one or more of the set of user identifiers based on which users of the set of user identifiers were a contributor to an event corresponding to a current element with an insight or any prior element corresponding to an event with an insight.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   identifying a first element of a thread of events based at least in part on a first event associated with a plurality of user identifiers, wherein the first element includes a respective next field and wherein each event of the thread of events corresponds to a communication between users associated with the plurality of user identifiers;
   adding, for each subsequent event corresponding to a communication by users associated with at least a subset of the plurality of user identifiers, a new element in the thread of events, each new element including the respective next field and a respective previous field, wherein the respective previous field of the new element includes one or more of the plurality of user identifiers that are associated with at least one prior event to the new element in the thread of events;
   updating, based at least in part on adding the new element, the respective next field of each element of the thread of events such that the respective next field includes one or more of the plurality of user identifiers that are associated with at least one subsequent event to a current element in the thread of events;
   receiving a query for a leading edge event of the thread of events for a target user of the plurality of user identifiers, wherein the query indicates the target user;
   identifying, starting with a latest element in the thread of events arranged in a chronological order, a first element that does not include the target user in the respective next field;
   identifying, as the leading edge event for the target user, an event corresponding to the first element that does not include the target user in the respective next field; and
   transmitting an indication of the leading edge event of the thread of events based at least in part on the query.

2. The method of claim 1, further comprising:
   receiving an indication to expand the leading edge event for the target user to a thread for the target user;
   identifying each element prior to the first element corresponding to the leading edge event that includes the target user in the respective next field until an element does not include the target user in the respective previous field; and
   transmitting an indication of each element as the thread for the target user.

3. The method of claim 1, further comprising:
   receiving an indication of a new event comprising at least a subset of the plurality of user identifiers, wherein the new event is associated with the thread of events in accordance with a thread identifier;
   identifying the thread of events using the thread identifier;
   adding, to the thread of events, a new element corresponding to the new event, wherein the new element includes the respective previous field including one or more of the plurality of user identifiers that are associated with at least one prior event to the new element in the thread of events; and
   updating, based at least in part on adding the new element to the new event, the respective next field of each element of the thread of events such that the respective next field includes one or more of the plurality of user identifiers that are associated with at least one subsequent event to the current element in the thread of events.

4. The method of claim 3, wherein receiving the indication of the new event comprises:
   detecting transmission of a new message between one or more of the plurality of user identifiers.

5. The method of claim 1, further comprising:
   storing a table in association with the thread of events, wherein the table includes a summary of the thread of events.

6. The method of claim 1, wherein each event corresponds to a meeting, an email, a message, or a phone call.

7. The method of claim 1, wherein each element of the thread of events further includes a respective contributor field that includes one or more of the plurality of user identifiers that includes user identifiers of the plurality of user identifiers that either contributed to an event of a current element or an event prior to the current element.

8. The method of claim 1, wherein each element of the thread of events further includes an insight field indicating one or more of the plurality of user identifiers based on which users of the plurality of user identifiers were a contributor to an event corresponding to a current element with an insight or any prior element corresponding to an event with an insight.

9. An apparatus for data processing, comprising: a processor, memory coupled with the processor; and instructions stored in the memory and executable by the processor to cause the apparatus to:
   identify a first element of a thread of events based at least in part on a first event associated with a plurality of user identifiers, wherein the first element includes a respective next field and wherein each event of the thread of events corresponds to a communication between users associated with the plurality of user identifiers;
   add, for each subsequent event corresponding to a communication by users associated with at least a subset of the plurality of user identifiers, a new element in the thread of events, each new element including the respective next field and a respective previous field, wherein the respective previous field of the new element includes one or more of the plurality of user identifiers that are associated with at least one prior event to the new element in the thread of events;
   update, based at least in part on adding the new element, the respective next field of each element of the thread of events such that the respective next field includes one or more of the plurality of user identifiers that are associated with at least one subsequent event to a current element in the thread of events;
   receive a query for a leading edge event of the thread of events for a target user of the plurality of user identifiers, wherein the query indicates the target user;

identify, starting with a latest element in the thread of events arranged in a chronological order, a first element that does not include the target user in the respective next field;

identify, as the leading edge event for the target user, an event corresponding to the first element that does not include the target user in the respective next field; and transmit an indication of the leading edge event of the thread of events based at least in part on the query.

10. The apparatus of claim 9, wherein the instructions are further executable by the processor to cause the apparatus to:

receive an indication to expand the leading edge event for the target user to a thread for the target user;

identify each element prior to the first element corresponding to the leading edge event that includes the target user in the respective next field until an element does not include the target user in the respective previous field; and transmit an indication of each element as the thread for the target user.

11. The apparatus of claim 9, wherein the instructions are further executable by the processor to cause the apparatus to:

receive an indication of a new event comprising at least a subset of the plurality of user identifiers, wherein the new event is associated with the thread of events in accordance with a thread identifier;

identify the thread of events using the thread identifier;

add, to the thread of events, a new element corresponding to the new event, wherein the new element includes the respective previous field including one or more of the plurality of user identifiers that are associated with at least one prior event to the new element in the thread of events; and update, based at least in part on adding the new element to the new event, the respective next field of each element of the thread of events such that the respective next field includes one or more of the plurality of user identifiers that are associated with at least one subsequent event to the current element in the thread of events.

12. The apparatus of claim 11, wherein the instructions to receive the indication of the new event are executable by the processor to cause the apparatus to:

detect transmission of a new message between one or more of the plurality of user identifiers.

13. The apparatus of claim 9, wherein the instructions are further executable by the processor to cause the apparatus to:

store a table in association with the thread of events, wherein the table includes a summary of the thread of events.

14. A non-transitory computer-readable medium storing code for data processing, the code comprising instructions executable by a processor to:

identify a first element of a thread of events based at least in part on a first event associated with a plurality of user identifiers, wherein the first element includes a respective next field and wherein each event of the thread of events corresponds to a communication between users associated with the plurality of user identifiers;

add, for each subsequent event corresponding to a communication by users associated with at least a subset of the plurality of user identifiers, a new element in the thread of events, each new element including the respective next field and a respective previous field, wherein the respective previous field of the new element includes one or more of the plurality of user identifiers that are associated with at least one prior event to the new element in the thread of events;

update, based at least in part on adding the new element, the respective next field of each element of the thread of events such that the respective next field includes one or more of the plurality of user identifiers that are associated with at least one subsequent event to a current element in the thread of events;

receive a query for a leading edge event of the thread of events for a target user of the plurality of user identifiers, wherein the query indicates the target user;

identify, starting with a latest element in the thread of events arranged in a chronological order, a first element that does not include the target user in the respective next field;

identify, as the leading edge event for the target user, an event corresponding to the first element that does not include the target user in the respective next field; and transmit an indication of the leading edge event of the thread of events based at least in part on the query.

15. The non-transitory computer-readable medium of claim 14, wherein the instructions are further executable to:

receive an indication to expand the leading edge event for the target user to a thread for the target user;

identify each element prior to the first element corresponding to the leading edge event that includes the target user in the respective next field until an element does not include the target user in the respective previous field; and transmit an indication of each element as the thread for the target user.

16. The non-transitory computer-readable medium of claim 14, wherein the instructions are further executable to:

receive an indication of a new event comprising at least a subset of the plurality of user identifiers, wherein the new event is associated with the thread of events in accordance with a thread identifier;

identify the thread of events using the thread identifier;

add, to the thread of events, a new element corresponding to the new event, wherein the new element includes the respective previous field including one or more of the plurality of user identifiers that are associated with at least one prior event to the new element in the thread of events; and update, based at least in part on adding the new element to the new event, the respective next field of each element of the thread of events such that the respective next field includes one or more of the plurality of user identifiers that are associated with at least one subsequent event to the current element in the thread of events.

17. The non-transitory computer-readable medium of claim 16, wherein the instructions to receive the indication of the new event are executable to:

detect transmission of a new message between one or more of the plurality of user identifiers.

* * * * *